United States Patent Office 3,786,043
Patented Jan. 15, 1974

3,786,043
7-METHYL-4-CHLORO (OR -4-LOWER-ALKOXY)-
1,8-NAPHTHYRIDINE-3-CARBOXYLATES
R. Pauline Brundage and George Y. Lesher, Schodack,
N.Y., assignors to Sterling Drug Inc., New York, N.Y.
No Drawing. Filed June 19, 1972, Ser. No. 263,788
Int. Cl. C07d 31/36
U.S. Cl. 260—295.5 B      3 Claims

ABSTRACT OF THE DISCLOSURE

Lower-alkyl 4 - Q - 7 - methyl-1,8-naphthyridine-3-carboxylates (I) where Q is chloro or lower-alkoxy are prepared by reacting lower-alkyl 1,4-dihydro-7-methyl-4-oxo - 1,8 - naphthyridine - 3 - carboxylate (II) with a chlorinating agent to produce said 4-chloro compound (Ia) which by reaction with alkali metal lower-alkoxide, preferably using lower-alkanol as solvent, produces said 4-(lower-alkoxy) compound (Ib). Said 4-chloro compound when heated with alkali metal lower-alkoxide or said 4-(lower-alkoxy) compound when heated yield the known antibacterially active lower-alkyl 1-(lower-alkyl)-1,4 - dihydro - 7 - methyl - 4 - oxo-1,8-naphthyridine-3-carboxylates.

---

This invention relates to lower-alkyl 4-substituted-7-methyl-1,8-naphthyridine-3-carboxylates and to processes for their preparation and utilization as intermediates.

The invention in its composition aspect resides in compounds of the Formula I

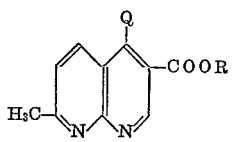

I where Q is chloro or lower-alkoxy and R is lower-alkyl. These compounds are useful as intermediates in the preparation of lower-alkyl 1 - (lower - alkyl)-1,4-dihydro-7-methyl - 4 - oxo - 1,8 - naphthyridine-3-carboxylates and corresponding 3-carboxylic acids, which are known antibacterial agents.

The invention in a process aspect resides in the process of reacting lower-alkyl, 1,4 - dihydro - 7 - methyl-4-oxo-1,8-naphthyridine-3-carboxylate with a chlorinating agent, e.g., phosphorus oxychloride, to yield lower-alkyl 4 - chloro-7-methyl-1,8-naphthyridine-3-carboxylate.

The invention in another process aspect resides in the process of reacting lower-alkyl 4-chloro - 7 - methyl-1,8-naphthyridine-3-carboxylate with alkali metal lower alkoxide, preferably using lower-alkanol as solvent, to produce lower-alkyl 4 - (lower - alkoxy) - 7 - methyl-1,8-naphthyridine-3-carboxylate.

The invention in another process aspect resides in the process of heating lower-alkyl 4-chloro-7-methyl-1,8-naphthyridine - 3 - carboxylate with alkali metal loweralkoxide to produce lower-alkyl 1-(lower-alkyl)-1,4-dihydro - 7 - methyl - 4 - oxo - 1,8 - naphthyridine-3-carboxylate. In this reaction the 4-chloro compound is first converted into the corresponding 4-(lower-alkoxy) compound which on heating is converted to the antibacterially active lower-alkyl 1 - (lower - alkyl) - 1,4-dihydro-7-methyl - 4 - oxo - 1,8-naphthyridine-3-carboxylate. Thus, this process aspect of the invention also resides in the process of heating lower-alkyl 4 - (lower - alkoxy)-7-methyl - 1,8 - naphthyridine - 3 - carboxylate to produce lower-alkyl 1 - (lower-alkyl) - 1,4 - dihydro-7-methyl-4-oxo - 1,8 - naphthyridine - 3 - carboxylate.

The processes of the invention are illustrated by the following flowsheet:

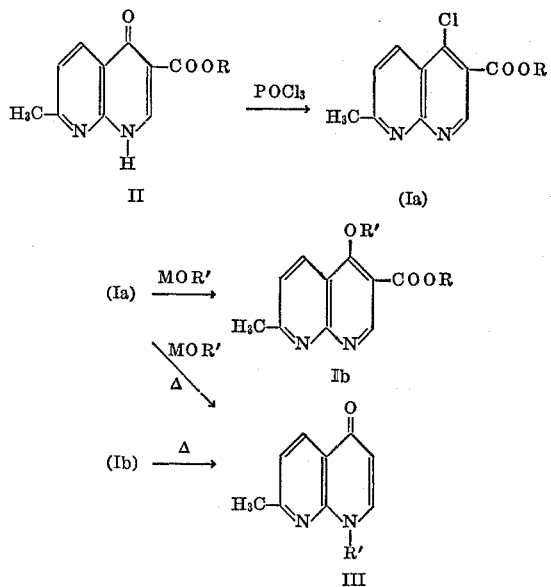

where M is alkali metal, and R and R' are each lower-alkyl and can be the same or different. When the reaction of Ia with MOR' is carried out using as solvent, lower-alkanol, R"OH where R" is lower-alkyl, the results are as follows:

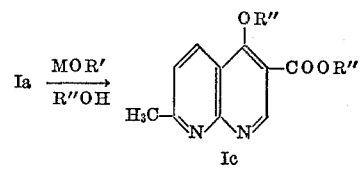

where R' and R" can be the same or different. Thus, MOR' first reacts with R"OH to produce MOR" which reacts with the 4-chlorocompound and the ester exchange reaction between R"OH and the 3-COOR compound to produce the 3-COOR" compound also takes place. Similarly, when Ia is heated with MOR' using R"OH as solvent, the resulting product is lower-alkyl 1,4-dihydro-1-R" - 7 - CH₃ - 1,8 - naphthyridine-3-carboxylate (IIIa), as follows:

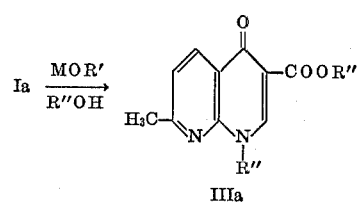

IIIa

The term "lower-alkyl," as used herein, means alkyl groups having from one to six carbon atoms, illustrated by methyl, ethyl, n-propyl, isopropyl, n-butyl, 2-butyl, isobutyl, n-amyl, n-hexyl, and the like.

The term "lower-alkoxy," as used herein, means alkoxy groups having from one to six carbon atoms, illustrated by methoxy, ethoxy, n-propoxy, isopropoxy, n-butoxy, 2-butoxy, isobutoxy, n-amoxy, n-hexoxy, and the like.

The intermediate compounds illustrated by Formula II, exist in tautomeric forms, that is, as the 1,4-dihydro-3-(COOR)-4-oxo-7-CH₃-1,8-naphthyridines of Formula II and/or the 3 - (COOR)-4-hydroxy-7-CH₃-1,8-naphthyridines of Formula II′, illustrated as follows:

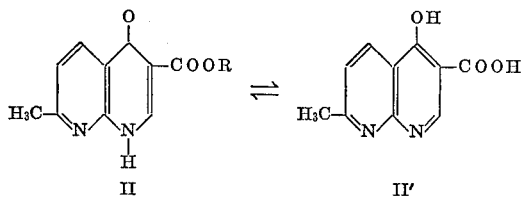

where R is lower-alkyl. Measurements of the infrared spectra, in potassium bromide admixture, or in chloroform solution or mineral oil suspension, indicate existence predominantly as structure II and we have preferred to use the names based on structure II, although it is understood that either or both structures are comprehended.

The molecular structures of the composition aspects of the invention are established by their mode of synthesis and confirmed by the correspondence of calculated and found values for the elementary analyses for representative examples and by infrared, ultraviolet and NMR spectral analyses.

The manner and process of making and using the instant invention will now be generally described so as to enable a person skilled in the art of chemistry to make and use the same as follows:

The reaction of lower-alkyl 1,4 - dihydro-7-methyl-4-oxo-1,8-naphthyridine - 3 - carboxylate with chlorinating agent, preferably phosphorus oxychloride, to produce lower-alkyl 4-chloro - 7 - methyl-1,8-naphthyridine-3-carboxylate is carried out by heating the reactants, preferably at about 50 to 110° C. The reaction is conveniently run by heating the reactants with stirring on a steam bath in the absence or presence of an inert solvent, e.g., benzene, toluene, xylene, chlorobenzene, chloroform, methylene dichloride, and the like. While the preferred chlorinating agent is phosphorus oxychloride, other chlorinating agents can be used, e.g., phosphorus dichloride, phosphorus pentachloride, thionyl chloride, phenylphosphonic dichloride, phosgene, and the like.

The reaction of lower-alkyl 4-chloro-7-methyl-1,8-naphthyridine-3-carboxylate with alkali metal lower-alkoxide to produce lower-alkyl 4 - (lower-alkoxy)-7-methyl-1,8-naphthyridine-3-carboxylate is carried out preferably at room temperature, although lower and higher temperatures, from about 0° C. up to about 50° C. may be used. Said alkali metal lower-alkoxide can be generated by any of several well known procedures, such as the reaction of an alkali metal or of any alkali organometallic, e.g., phenyllithium, or of a different alkali metal lower-alkoxide with a lower-alkanol. Although this reaction is run preferably with lower-alkanol as the solvent, it also can be run by using a solvent inert under the reaction conditions, e.g., acetonitrile, dimethylformamide, tetrahydrofuran, ether, benzene, toluene, chloroform, and the like.

The reaction of lower-alkyl 4-chloro-7-methyl-1,8-naphthyridine-3-carboxylate with alkali metal lower-alkoxide to produce lower-alkyl 1 - (lower-alkyl)-1,4-dihydro-7-methyl-4-oxo-1,8 - naphthyridine-3-carboxylate is carried out by heating the reactants together. This reaction as well as the conversion of lower-alkyl 4-(lower-alkoxy)-7-methyl-1,8-naphthyridine-3-carboxylate by heating to produce lower-alkyl 1-(lower-alkyl)-1,4-dihydro-7-methyl-4-oxo-1,8-naphthyridine-3-carboxylate are run at about 70–250° C., preferably at about 90–110° C., in the absence or presence of a suitable solvent inert under the reaction conditions, e.g., lower-alkanol, acetonitrile, dimethylformamide, tetrahydrofuran, ether, benzene, toluene, chloroform, and the like. The 4-chloro compound (Ia) is first converted to the 4-(lower-alkoxy) compound (Ib) which then on heating yields the 1-(lower-alkyl)-1,4-dihydro-4-oxo compound (III). The conversion of lower-alkyl 4-(lower-alkoxy) - 7 - methyl-1,8-naphthyridine-3-carboxylate to lower-alkyl 1-(lower-alkyl)-1,4-dihydro-7-methyl-4-oxo-1,8-naphthyridine-3-carboxylate is conveniently run by heating the reactants on a steam bath in the absence of a solvent; however, solvents such as those named above can be used.

The best mode contemplated for carrying out the invention is now set forth as follows:

EXAMPLE 1

Ethyl 4-chloro-7-methyl-1,8-naphthyridine-3-carboxylate

A mixture containing 10 g. of ethyl 1,4-dihydro-4-oxo-7-methyl-1,8-naphthyridine-3-carboxylate and 80 ml. of phosphorus oxychloride was heated at 105° C. for seven minutes with stirring. Most of the phosphorus oxychloride was distilled off in vacuo and the residual solution was poured into a mixture of ammonium hydroxide and ice. After the mixture had been allowed to stand for about forty-five minutes, the resulting precipitate was collected, washed with water and dissolved in methylene dichloride. The methylene dichloride solution was separated from a small amount of aqueous phase and was dried over anhydrous sodium sulfate. The solution was evaporated in vacuo to near dryness and to the remaining solution was added about 100 ml. of ether. The resulting precipitate was collected and extracted repeatedly with ether. The ether extracts were combined and partially evaporated on a steam bath whereupon a crystalline light orange solid separated. The solid was collected and the filtrate again partially evaporated on a steam bath, yielding a second crop. The two crops were combined and air-dried to yield 6.3 g. of ethyl 4-chloro-7-methyl-1,8-naphthyridine-3-carboxylate, M.P. 100° C.

EXAMPLE 2

Ethyl 4-chloro-7-methyl-1,8-naphthyridine-3-carboxylate

A mixture containing 69.6 g. of ethyl 1,4-dihydro-7-methyl-4-oxo-1,8-naphthyridine-3-carboxylate and 550 ml. of phosphorus oxychloride was heated with stirring at 93–96° C. for seven minutes. Heating was discontinued and most of the phosphorus oxychloride was distilled off in vacuo. The residue was poured with stirring into a mixture of ice water and ammonium hydroxide. The precipitated product was collected and extracted with 600 ml. of methylene dichloride. The insoluble material was filtered off and the filtrate dried over anhydrous sodium sulfate. The methylene dichloride solution was concentrated in vacuo to a volume of about 50 ml. and to the resulting liquid-solid mixture was added about 800 ml. of ether. The mixture was heated to boiling and the undissolved material was collected. [This undissolved material was extracted with about 800 ml. of boiling ether and filtered to yield a solution containing ethyl 4-chloro-7-methyl-1,8-naphthyridine-3-carboxylate which was used directly in Example 3.] The filtrate was evaporated to about 400 ml. and allowed to stand overnight (about fifteen hours). The crystalline precipitate was collected to yield 13 g. of ethyl 4-chloro-7-methyl-1,8-naphthyridine-3-carboxylate. The filtrate was concentrated in vacuo to dryness at about 50° C. and the residual solid was recrystallized twice from benzene to yield 2.5 g. of ethyl 4-chloro-7-methyl-1,8-naphthyridine-3-carboxylate, which was used directly in Example 4.

EXAMPLE 3

Methyl 4-methoxy-7-methyl-1,8-naphthyridine-3-carboxylate

The ether filtrate from Example 2 containing ethyl 4 - chloro-7-methyl-1,8-naphthyridine-3-carboxylate was concentrated in vacuo to dryness avoiding heat. To the remaining crystalline residue of ethyl 4-chloro-7-methyl-1,8-naphthyridine-3-carboxylate (about 1 g.) was added a solution of about 1 g. of sodium methoxide in about 25 ml. of methanol, whereupon sodium chloride separated at once from the resulting dark green solution. After standing overnight, the reaction mixture was neutralized with acetic acid, concentrated in vacuo and the residue extracted with ether. The ether extract was filtered, the ether filtrate concentrated to dryness, and residue recrystallized from benzene to yield, as a yellow solid, methyl 4-methoxy-7-methyl - 1,8 - naphthyridine-3-carboxylate, M.P. 110–112° C. The chemical structure of this compound was confirmed by its NMR (5% in CDCl$_3$) and UV analyses and by its elemental analyses for C, H and N.

EXAMPLE 4

Methyl 1,4-dihydro-1,7-dimethyl-4-oxo-1,8-naphthyridine-3-carboxylate

The 2.5 g. portion of ethyl 4-chloro-7-methyl-1,8-naphthyridine-3-carboxylate from Example 2 was dissolved in a solution of 0.8 g. of sodium methoxide in 25 ml. of methanol whereupon sodium chloride started to separate immediately from the green solution. The reaction mixture was allowed to stand overnight and then was filtered. The filtrate was concentrated to dryness and heated in vacuo on a steam bath for about three hours. The residual dark solid was extracted with boiling benzene, the hot benzene extract filtered and the filtrate concentrated in vacuo to remove the benzene. The residue was triturated with a small volume of acetone at room temperature; the mixture was filtered; and the filtercake was recrystallized from ethanol to yield, as tan colored needles, 350 mg. of methyl 1,4-dihydro - 1,7 - dimethyl-4-oxo-1,8-naphthyridine-3-carboxylate, M.P. 200–202° C. The chemical structure of this compound was confirmed by its NMR analysis (5% in CDCl$_3$) and its elemental analyses for C, H and N.

Alkaline hydrolysis of methyl 1,4-dihydro-1,7-dimethyl-4-oxo-1,8-naphthyridine-3-carboxylate, for example using aqueous potassium hydroxide, a known procedure, yields the corresponding 1,4-dihydro-1,7-dimethyl-4-oxo-1,8-naphthyridine-3-carboxylic acid, which is shown as Example 4 in the U.S. Pat. No. 3,590,036, issued June 29, 1971; said patent also shows the intermediate lower-alkyl 4-hydroxy-7-methyl - naphthyridine-3-carboxylates of Formula II′ discussed hereinabove.

We claim:
1. A compound of the formula

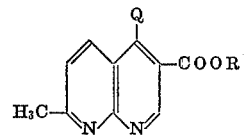

where Q is chloro or lower-alkoxy and R is lower-alkyl.

2. Ethyl 4-chloro-7-methyl - 1,8 - naphthyridine-3-carboxylate according to claim 1.

3. Methyl 4-methoxy - 7 - methyl-1,8-naphthyridine-3-carboxylate according to claim 1.

References Cited

UNITED STATES PATENTS 3,590,036    6/1971    Lesher et al. _____ 260—295.5 B

ALAN L. ROTMAN, Primary Examiner

U.S. Cl. X.R.

424—266

UNITED STATES PATENT OFFICE
CERTIFICATE OF CORRECTION

Patent No. 3,786,043      Dated January 15, 1974

Inventor(s) Ruth Pauline Brundage and George Y. Lesher

It is certified that error appears in the above-identified patent and that said Letters Patent are hereby corrected as shown below:

Column 2, lines 20 thru 25, the formula designated as III should read as follows:

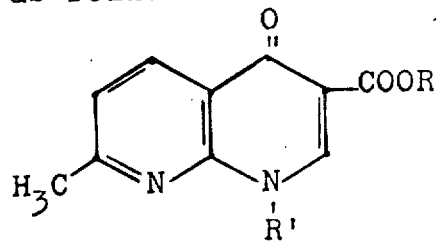

Column 3, lines 3 thru 10, the formula designated as II' should read as follows:

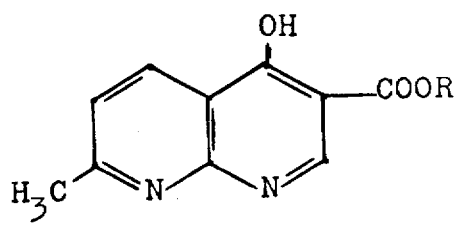

Signed and sealed this 18th day of February 1975.

(SEAL)
Attest:

RUTH C. MASON
Attesting Officer

C. MARSHALL DANN
Commissioner of Patents
and Trademarks